United States Patent
Chadha et al.

(10) Patent No.: US 6,894,989 B1
(45) Date of Patent: May 17, 2005

(54) SEPARATION CIRCUIT FOR AN ECHO CANCELING SYSTEM AND METHOD OF OPERATING THE SAME

(75) Inventors: Mandeep Singh Chadha, Austin, TX (US); Shawn Robert McCaslin, Buda, TX (US); Mile Milisavljevic, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 788 days.

(21) Appl. No.: 09/650,854

(22) Filed: Aug. 29, 2000

(51) Int. Cl.$^7$ ................................................. H04B 3/20
(52) U.S. Cl. .................. 370/289; 370/290; 379/406.05; 379/406.06; 375/222
(58) Field of Search ................................ 370/268, 269, 370/286, 289, 290; 379/406.01, 406.05, 406.06, 406.08; 455/570; 375/222, 285, 346

(56) References Cited

U.S. PATENT DOCUMENTS

| | | | | |
|---|---|---|---|---|
| 4,707,824 A | * | 11/1987 | Kanemasa | ................... 370/290 |
| 4,896,334 A | | 1/1990 | Sayar | ........................... 375/20 |
| 4,924,492 A | * | 5/1990 | Gitlin et al. | ............. 379/93.08 |
| 5,351,087 A | | 9/1994 | Christopher et al. | |
| 5,353,279 A | * | 10/1994 | Koyama | ..................... 370/290 |
| 5,396,517 A | * | 3/1995 | Yedid et al. | ................. 375/233 |
| 5,418,849 A | * | 5/1995 | Cannalire et al. | ...... 379/406.08 |
| 5,512,898 A | | 4/1996 | Norsworthy et al. | |
| 5,526,139 A | | 6/1996 | Rousell et al. | |
| 5,574,756 A | | 11/1996 | Jeong | ........................... 375/376 |
| 5,604,769 A | | 2/1997 | Wang | |
| 5,610,909 A | | 3/1997 | Shaw | |
| 5,631,899 A | | 5/1997 | Duttweiler | |
| 5,668,794 A | | 9/1997 | McCaslin et al. | |
| 5,732,107 A | | 3/1998 | Phillips et al. | |
| 5,748,126 A | | 5/1998 | Ma et al. | |
| 5,809,033 A | | 9/1998 | Turner et al. | |
| 5,841,809 A | * | 11/1998 | Koizumi et al. | ............. 375/233 |
| 5,926,505 A | | 7/1999 | Long | |
| 5,970,137 A | | 10/1999 | Le Damany et al. | |
| 6,208,671 B1 | | 3/2001 | Paulos et al. | |
| 6,240,128 B1 | * | 5/2001 | Banerjea et al. | ............. 375/222 |

(Continued)

OTHER PUBLICATIONS

Floyd M. Gardner "Interpolation in Digital Modems—Part I: Fundamentals" IEEE Transactoins on Communications, vol. 41, No. 3, Mar. 1993; pp. 501–507.

Lars Erup, et al. "Interpolation in Digital Modems—Part II: Implementation and Performance" IEEE Transactions on Communications, vol. 41, No. 6, Jun. 1993; pp. 998–1008.

James. D. Barnette, et al.; U.S. patent application Ser. No. 09/652.116, filed Aug. 29, 2000 entitled "Resampler for a bit Pump and Method of Resampling a Signal Associated Therewith";pp. 1–59; 6 drawing sheets.

(Continued)

*Primary Examiner*—Andy Lee
*Assistant Examiner*—Duc Duong

(57) ABSTRACT

A separation circuit, method of determining a residual level of an echo, and an echo canceling system, bit pump and transceiver employing the circuit and method. The echo canceling system employing the separation circuit is couplable between a transmit and receive path of the bit pump and generates an echo canceling signal. In one embodiment, the separation circuit includes a symbol determination circuit that accepts a receive signal, propagating along the receive path, substantially free of an echo and determines a symbol associated with the receive signal. The separation circuit also includes an estimator stage, coupled to the symbol determination circuit, that receives the symbol and provides an estimated receive signal. The separation circuit generates data representing a residual level of the echo as a function of the estimated receive signal and the echo canceling signal.

35 Claims, 6 Drawing Sheets

U.S. PATENT DOCUMENTS

| | | |
|---|---|---|
| 6,327,666 B1 | 12/2001 | Langberg et al. ........... 713/400 |
| 6,389,064 B1 | 5/2002 | Dholakia et al. |
| 6,434,233 B1 | 8/2002 | Bjamason et al. |
| 6,532,289 B1 | 3/2003 | Magid |
| 6,573,940 B1 | 6/2003 | Yang .......................... 348/441 |
| 6,597,787 B1 | 7/2003 | Lindgren et al. |
| 6,628,738 B1 | 9/2003 | Peeters et al. |

OTHER PUBLICATIONS

Mandeep Singh Chadha, et al.; U.S. patent application Ser. No. 09/650,851, filed Aug. 29, 2000 entitled "Filter Circuit for a Bit Pump and Method of Configuring the Same"; pp. 1–57; 7 drawing sheets.

Mandeep Singh Chadha, et al.; U.S. patent application Ser. No. 09/650,853, filed Aug. 29, 2000 entitled "Echo Canceling System for a Bit Pump and Method of Opearting the Same"; pp. 1–60; 5 drawing sheets.

James D. Barnette; U.S. patent application Ser. No. 09/650,850, filed Aug. 29, 2000 entitled "An Interpolator, a Resampler Employing the Interpolator and Method of Interpolating a Signal Associated Therewith"; pp. 1–78; 6 drawing sheets.

"Multirate Systems and Filter Banks," by P. P. Vaidyanathan. Prentice Hall Signal Processing Series. Chap. 5. Section 5.3. pp. 211–213. Jul. 1992.

* cited by examiner

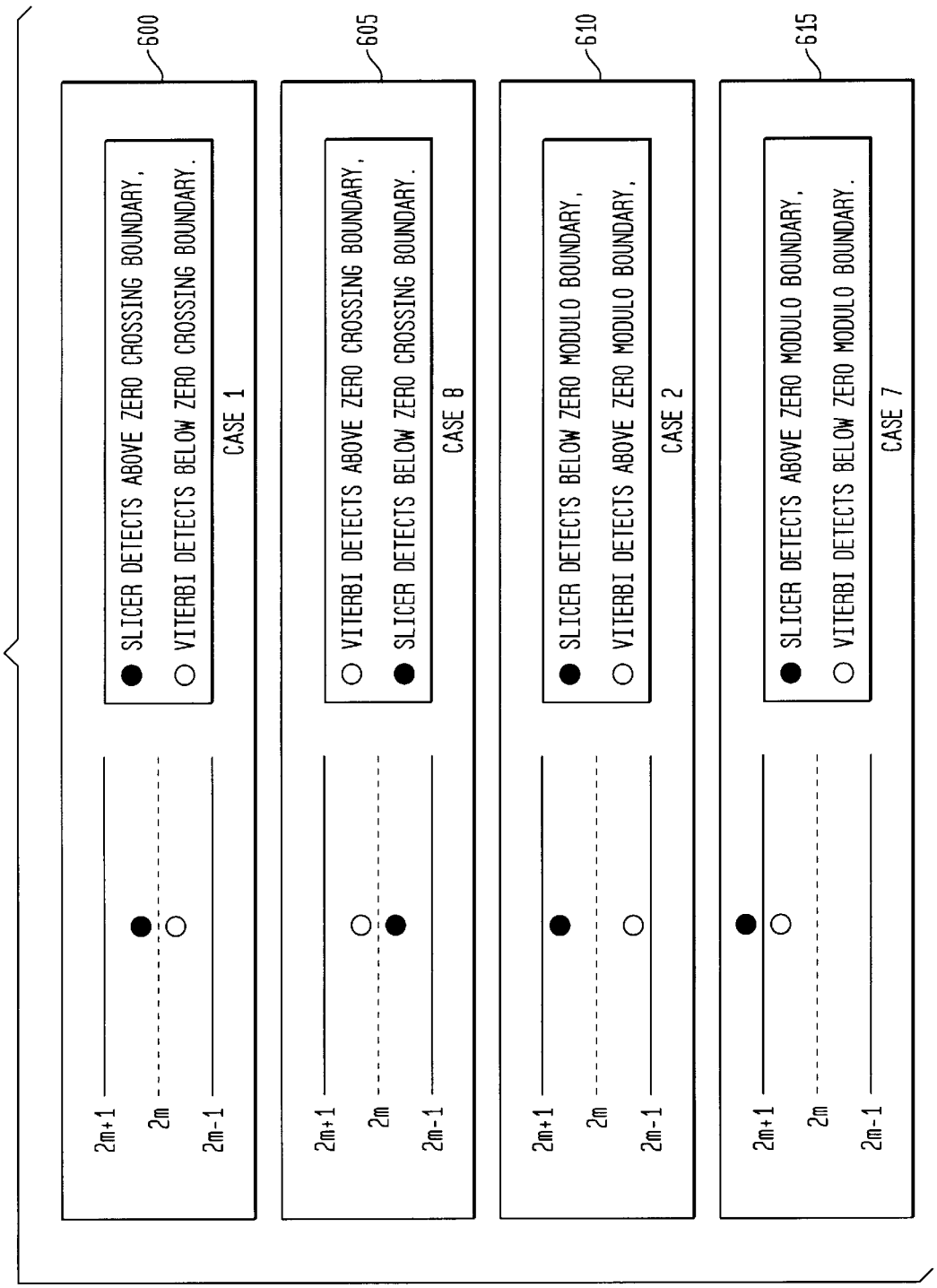

SEPARATION CIRCUIT FOR AN ECHO CANCELING SYSTEM AND METHOD OF OPERATING THE SAME

CROSS-REFERENCE TO RELATED APPLICATION

This U.S. application is related to the following U.S. applications.

| Reference Number | File Date | Title |
| --- | --- | --- |
| Chadha 1-1-1-1 | Aug. 29, 2000 | FILTER CIRCUIT FOR A BIT PUMP AND METHOD OF CONFIGURING THE SAME |
| Chadha 2-2-2 | Aug. 29, 2000 | SEPARATION CIRCUIT FOR AN ECHO CANCELING SYSTEM AND METHOD OF OPERATING THE SAME |
| Chadha 3-3-1 | Aug. 29, 2000 | ECHO CANCELING SYSTEM FOR A BIT PUMP AND METHOD OF OPERATING THE SAME |
| Barnette 1 | Aug. 29, 2000 | AN INTERPOLATOR, A RESAMPLER EMPLOYING THE INTERPOLATOR AND METHOD OF INTERPOLATING A SIGNAL ASSOCIATED THEREWITH |
| Barnette 2-2 | Aug. 29, 2000 | RESAMPLING FOR A BIT PUMP AND METHOD OF RESAMPLING A SIGNAL ASSOCIATED THEREWITH |

The above-referenced U.S. applications are commonly assigned with the present invention and incorporated herein by reference.

TECHNICAL FIELD OF THE INVENTION

The present invention is directed, in general, to digital signal processing and, more specifically, to a separation circuit for an echo canceling system of a bit pump employing the echo canceling system.

BACKGROUND OF THE INVENTION

The existing public switched telephone network represents a significant capital investment that has taken place in great part over the last 80 years. The public switched telephone network was originally designed for voice services (so-called plain old telephone service) and was entirely analog.

Originally, the public switched telephone network included "local loops," which connected homes and businesses to central office switches. This allowed anyone having a telephone connected to the central office switch to call one another. A given central office typically only covers a relatively small area.

To allow people to call one another from greater distances, central office switches were interconnected by analog trunks. Unfortunately, signal quality suffered greatly as distances increased. Filters and amplifiers improved quality, but only to a limited extent.

Over time, however, the analog trunks (that may be thought of as forming the "backbone" of the public switched telephone network) were replaced with land-based microwave, satellite and optical fiber links. Public switched telephone network signals ("traffic") were digitized for transmission over the backbone, significantly improving signal quality, service and reliability.

To maximize utilization of the backbone, an assumption was made that, at the time, seemed straightforward. The assumption was based on the observation that public switched telephone network traffic consisted of human speech, which by its nature occupies frequencies below 4 kilohertz (kHz).

Thus, it was decided that higher frequencies were of limited value and represented a waste of bandwidth if the traffic were to be digitized and transmitted. The higher frequencies were, as a result, discarded when signals were initially digitized. The net effect was that more conversations were carried over a given microwave, satellite or fiber link.

While truncating the frequencies above 4 kHz was of no consequence to the transmission of speech, the same proved not to be true for data. In the quest for speed, computer modems have attempted to use as much bandwidth as possible, and in the most clever manner. Unfortunately, even in view of the most clever modems, the 4 kHz digitization cutoff has imposed an apparent limit on the speed of such devices. Unfortunately, the analog local loops have unjustly taken most of the blame for the speed limitation.

Digital subscriber line (DSL), developed over the past few years, presents a novel solution to the speed limitation conundrum. According to DSL, local loops are employed to carry speech in a stream at normal frequencies (exclusively below 4 kHz). The local loops, however, are also called upon to carry data in a stream at frequencies exclusively above 4 kHz. DSL termination circuits located at the home or business and the central office combine and separate the voice and data streams as they enter and leave the local loop. Once separated at the central office, the voice stream is digitized for relay over the public switched telephone network backbone as before, and by employing the existing infrastructure. The data stream, however, is sent through the public switched telephone network or another network (such as the Internet via a different path), without imposition of the 4 kHz artificial bandwidth limits.

One form of DSL, Asymmetrical DSL (ADSL) was designed with the Internet particularly in mind and accordingly emphasizes downloading of data over uploading of data (which is the nature of Internet "surfing"). ADSL uses the frequency spectrum between 0–4 kHz for the plain old telephone service stream and 4 kHz to 2.2 MHZ for the data stream. Depending on the design, length and conditions of the local loop, ADSL can offer speeds up to 9 Mbits/s (Mbps) for downstream (network to user) and up to 800 Kbps for upstream (user to network) communication.

Another form of DSL, High-Bit Rate DSL (HDSL) is a technology extension of DSL. HDSL is a symmetric transport medium, meaning that it provides 1.544 Mbps transmission speed both downstream and upstream over distances as far as 12,000 feet, without repeaters. Because about 20% of loops are longer than 12,000 feet, the industry has developed a repeater for HDSL that effectively doubles the span's reach to 24,000 feet. HDSL is based on a technology called adaptive equalization, which digitally analyzes and then compensates for distortion, imperfections in the copper line itself as well as adverse environmental conditions, throughout the transmission process. Furthermore, HDSL transmits full-duplex signals on each pair of wire and uses echo cancellation to separate the receive signals from the transmit signals.

To enhance and build on that inherent symmetry, standards bodies are now working on HDSL's next generation, called HDSL2. HDSL2 promises full-duplex T-Carrier 1 (T1) payload over one copper loop, while still delivering the same time and cost efficiencies for T1 deployment that HDSL offers. Carriers everywhere are running out of copper in their local loop plants. One of HDSL2's key benefits will focus squarely on and alleviate that concern. Essentially, the technology will double the number of available T1 lines because it requires only a single copper pair, compared with the two pairs required by the standard HDSL. As a result, HDSL2 may replace standard HDSL for most T1 deployments in the future, although HDSL will remain an option in those cases in which there may still be some engineering reasons for deploying a two-loop solution. One example is with long loops in excess of 12,000 feet, where span-powered HDSL repeaters may still be necessary. Beyond just workhorse T1 deployment, HDSL2 also should prove to be a viable competitive technology for Internet access applications that require symmetrical data delivery.

HDSL2, therefore, further enhances the noteworthy advantages associated with DSL. First, DSL-based technology does not require local loops to be replaced. Second, DSL-based technology overcomes the 4 kHz digitization barrier without requiring changes to existing public switched telephone network voice-handling equipment. Third, DSL-based technology requires relatively little equipment to combine and later separate speech and data streams. Fourth, DSL-based technology allows speech and data to occur simultaneously over the same local loop. HDSL2 now promises full-duplex T1 payload over one copper loop, while still delivering the same time and cost efficiencies for T1 deployment that its predecessor, HDSL, offers.

Some technical challenges, however, remain for HDSL2. One is designing a transceiver that can accommodate the full-duplex T1 payload in conjunction with the standard defined by American National Standards Institute (ANSI) committee T1E1.4 (June 1995), which is incorporated herein by reference. In conjunction therewith, echo cancellation techniques may be employed in the digital signal processing portion of the transceiver to reduce the magnitude of an echo associated with the information transmitted over the HDSL2 network.

For a DSL-based system, an echo of the transmit signal usually occurs at the point where the transmit path and the receive path are joined together. A hybrid circuit, typically used to connect these two paths to the twisted-pair telephone line, generates the echo which propagates down the receive path along with any receive signal from the far end. An echo may easily be 15 decibels (dB) greater than a strong receive signal thereby making processing of the receive signal at least more difficult. As the receive signal becomes weaker, acceptable processing of the receive signal becomes even more difficult due to the overriding effects of the echo. Therefore, echo cancellation is usually employed in a transceiver employed in the DSL-based system.

Digital adaptive echo cancellers are located between the transmit path and the receive path thereby operating in parallel with an echo. The echo canceller synthesizes the echo path, which may include a digital-to-analog converter, a transmitter filter, the hybrid circuit, a receiver filter and an analog-to-digital converter. The echo canceller is called upon to produce a replica of the echo using the same transmit data but having a reversed polarity to cancel the real echo.

Additionally, the echo canceller should have the ability to track and compensate for changes in the hybrid circuit and transmission line to maintain a satisfactory level of performance. This task is often made more difficult due to high levels of disturber signals, which are signal sources of crosstalk noise. One of the highest interferers to the echo is the receive signal from the far end. This condition generally occurs when the echo canceller is attempting to cancel an echo and a large signal from the far end occurs thereby introducing a response transient into the echo canceller. The echo canceller employs coefficients that are typically adaptable by using a method analogous to the method for conditioning the coefficients during activation of the system. Interference, caused by receive signals from the far end, is usually mitigated by reducing the update gains during operational tracking.

This approach has a fundamental problem with the speed and adaptability of the updates. When disturber levels are high, update gains are made small to prevent drift in the echo canceller coefficients. The reduction of the echo canceller update gain, however, results in an improper response for higher update values thereby lowering the ability of the echo canceller to track the necessary changes. Therefore, the combination of lower update gains and higher disturber levels results in an echo being canceled with less precision thereby lowering the overall performance of the transceiver.

Additionally, an echo canceller, operating with a slicer, is very sensitive to disturber signals. The slicer, however, is preferable to supply the echo canceller with receive symbols wherein the slicer may typically perform a slicing operation without discarding any modulo information that may be present. Present sensitivity to disturber signals can easily result in ten percent of the receive signals being erroneously estimated. This action contributes to an additional degradation in the performance of the echo canceller.

Accordingly, what is needed in the art is a subsystem associated with an echo canceling system employable in the digital signal processing portion of a transceiver that provides a more robust and therefore reliable estimate of the echo to enhance communication over, for instance, a network employing DSL-based technology such as HDSL2.

SUMMARY OF THE INVENTION

A separation circuit, method of determining a residual level of an echo, and an echo canceling system, bit pump and transceiver employing the circuit and method. The echo canceling system employing the separation circuit is couplable between a transmit and receive path of the bit pump and generates an echo canceling signal. In one embodiment, the separation circuit includes a symbol determination circuit that accepts a receive signal, propagating along the receive path, substantially free of an echo and determines a symbol associated with the receive signal. The separation circuit also includes an estimator stage, coupled to the symbol determination circuit, that receives the symbol and provides an estimated receive signal. The separation circuit generates data representing a residual level of the echo as a function of the estimated receive signal and the echo canceling signal.

The present invention introduces, in one aspect, a separation circuit that distinguishes a residual level of the echo from the receive signal to further attenuate the echo. The ability to distinguish the residual level of the echo depends on the ability of the separation circuit to estimate the receive signal and separate it from a combined residual echo level and receive signal. The present invention provides an enhanced capability to establish the receive signal over a wide range of signal-to-noise ratio values. As a result, the echo canceling system reduces the echo to levels not previously attainable, thereby increasing the fidelity of communication traffic (e.g., voice, video or data) traversing a network employing the bit pump (the digital signal processing portion of the transceiver) and reducing an error back propagation probability associated therewith.

In one embodiment of the present invention, the symbol determination circuit includes an equalizer/slicer stage that determines the symbol and a symbol correction stage that refines the symbol. The equalizer/slicer stage may advantageously employ a feed forward equalizer, a decision feedback equalizer and a noise prediction equalizer to whiten any noise present, reduce linear distortion and remove any noise correlation. The slicer performs symbol by symbol decoding and the symbol correction stage refines the symbol from the slicer to enhance overall signal fidelity and reliability.

In one embodiment of the present invention, the symbol correction stage includes a Viterbi decoder that receives the symbol and enhances a signal-to-noise ratio of the symbol. In a related, but alternative embodiment, the symbol correction stage further includes a convolutional encoder that reduces intersymbol interference associated with the symbol. In yet another related, but alternative embodiment, the symbol correction stage further includes logic circuits that provide a correction signal and modulo offset signal to refine the symbol. The symbol-correction stage may include the aforementioned circuits discretely or in an integrated configuration to further refine the symbol.

In one embodiment of the present invention, the estimator stage includes an inverse feed forward equalizer (or inverse feed forward equalizer channel estimator) and a finite impulse response filter. The inverse feed forward equalizer may be adapted by using a least-mean-square rule employing data from the separation circuit. The finite impulse response filter generally employs linear, fractionally-spaced, minimum mean square error equalization. The estimator stage constructs a reliable receive signal based on the refined symbols generated by the symbol determination circuit.

In one embodiment of the present invention, the echo canceling system includes master and slave echo canceling stages. In conjunction with this embodiment of the present invention, the echo canceling system advantageous employs master and slave echo canceling stages to attenuate the echo. The residual level of the echo is used by the master echo canceling stage to adaptively generate filter coefficients that are also employable by the slave echo canceling stage to provide an enhanced attenuation of the echo.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 6 illustrates modulo diagrams demonstrating a representative collection of correction conditions that lead to a determination of non-trivial correction factors for the symbol correction stage of FIG. 5.

DETAILED DESCRIPTION

Figure 1:
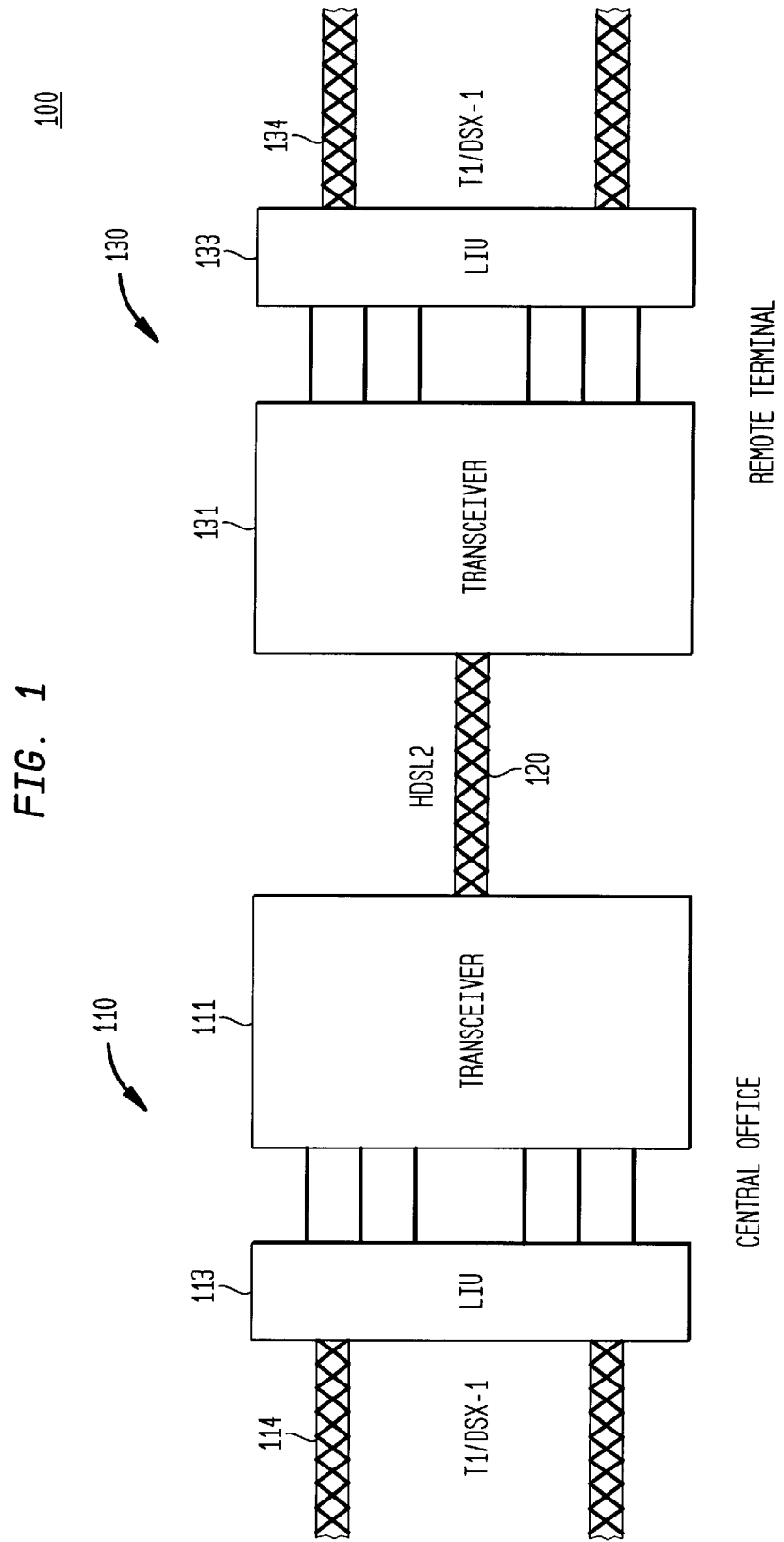
FIG. 1 illustrates a system level diagram of an embodiment of a communications network within which an embodiment of a transceiver constructed according to the principles of the present invention may operate.

Referring initially to FIG. 1, illustrated is a system level diagram of an embodiment of a communications network, generally designated 100, within which an embodiment of a transceiver constructed according to the principles of the present invention may operate. The communications network 100 may form a portion of a larger communications network (e.g., the public switched telephone network) and may advantageously provide high-bit-rate digital subscriber line service over a single twisted pair wire (commonly referred to as HDSL2). The communications network 100 includes a central office 110 and a remote terminal 130. The central office 110 embodies any conventional or later developed switching system that facilitates communications over the communications network 100. The remote terminal 130 embodies any conventional or later developed communications device (e.g., a multimedia personal computer) adapted to communicate with the communications network 100. It should be understood that the central office 110 may be advantageously coupled to a plurality of remote terminals 130.

The central office 110 is coupled via one or more central office trunks (one of which is designated 114) to the public switched telephone network. The central office trunks 114 are designated as either T1 long haul or DSX-1 short haul trunks for illustrative purposes only. The central office trunks 114 are coupled via a central office line interface unit 113 to a central office transceiver 111.

The remote terminal 130 is coupled via one or more remote terminal trunks (one of which is designated 134) to the public switched telephone network. The remote terminal trunks 134 are also designated as either T1 long haul or DSX-1 short haul trunks for illustrative purposes only. The remote terminal trunks 134 are coupled via a remote terminal line interface unit 133 to a remote terminal transceiver 131.

The central office 110 is coupled to the remote terminal 130 via a single twisted pair wire (or single copper loop) 120 adapted to carry the high-bit-rate digital subscriber line service. The central office and remote terminal transceivers 110, 130 provide the requisite signal processing and other core functions to support the high-bit-rate digital subscriber line service. Those skilled in the art should understand that the communications network 100 is submitted for illustrative purposes only and other network configurations (including communications networks compatible with digital subscriber line service) are well within the broad scope of the present invention.

Figure 2:
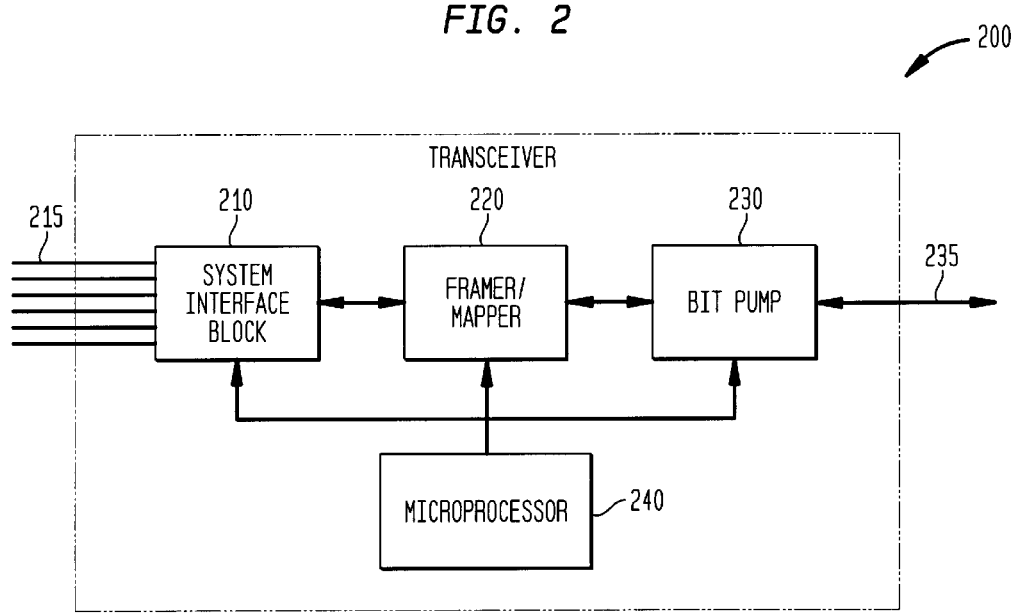
FIG. 2 illustrates a block diagram of an embodiment of a transceiver constructed according to the principles of the present invention.

Turning now to FIG. 2, illustrated is a block diagram of an embodiment of a transceiver 200 constructed according to the principles of the present invention. The transceiver 200 includes a system interface block 210 that provides an interface to, for instance, the public switched telephone network via T1 trunks (one of which is designated 215). The system interface block 210 can support any one of a number of transport medium and standards in addition to the T1 payload. The system interface block 210 performs system level functions such as processing commands/status information and providing connectivity to an embedded operations channel and an external system processor. The embedded operations channel is typically a virtual communications channel embedded in the physical layer for inter-transceiver and network maintenance purposes. The external system processor, in conjunction with an internal microprocessor, configures the transceiver 200 and monitors the operational status of the transceiver 200.

The transceiver 200 also includes a framer/mapper 220 coupled to the system interface block 210. The framer/mapper 220 provides transmission convergence between the standard interface block 210 and the frames associated with the information traversing a twisted pair wire (e.g., the HDSL2 frames). In conjunction therewith, the framer/mapper 220 provides frame synchronization, bit stuffing, jitter control processing and rate correction. The framer/mapper 220 also multiplexes/demultiplexes the channels associated with the transceiver 200, provides payload error detection and scrambles/descrambles signals in accordance with a particular application. Thus, the framer/mapper 220 is principally responsible for the transmission convergence within the transceiver 200.

The transceiver 200 further includes a bit pump 230 coupled to the framer/mapper 220. The bit pump 230 is the digital signal processing portion of the transceiver 200 and is coupled, via an analog front end, to a twisted pair wire 235 adapted to carry the high-bit-rate digital subscriber line service. A transmit path of the bit pump 230 receives data bits from the framer/mapper 220 and converts the bit stream into, for instance, 72X oversampled, 3-bit data for transmission by a digital-to-analog converter associated with the analog front end over the twisted pair wire 235. A receive path of the bit pump 230 receives the 3-bit, 72X oversampled received data from an analog-to-digital converter associated with the analog front end and converts the received data to an output bit stream for delivery to a deframer and, ultimately, to the framer/mapper 220.

The bit pump 230 generally performs two classes of signal processing, namely, symbol-time referenced and symbol-time independent processing. The symbol-time referenced processing includes functions like echo cancellation and equalization whereas symbol-time independent processing includes functions like transmitter digital sigma/delta modulation. An architecture associated with an embodiment of a bit pump 230 will be described with respect to FIG. 3.

The transceiver 200 still further includes a controller (e.g., an on-chip control microprocessor) 240 coupled to the system interface block 210, the framer/mapper 220 and the bit pump 230. The controller 240 communicates with and coordinates the operations between the system interface block 210, the framer/mapper 220 and the bit pump 230. For instance, the controller 240 performs the initialization process for the transceiver 200 by, among other things, initializing selected registers in the framer/mapper 220 and the bit pump 230 to a known state. The controller 240 generally writes or reads data to/from the mapper/framer 220 and the bit pump 230 using a memory mapped input/output operation through a peripheral bridge. While the read/write memory operation is intended to be used in debugging, characterization and production testing, it is not generally employed in end user applications, except for a built-in self testing mode.

The controller 240, however, has access to and updates the registers of the framer/mapper 220 and bit pump 230 during activation (including initialization) and communication phases of the transceiver 200. The controller 240 receives information such as performance characteristics and bit pump attributes (e.g., filter lengths, gains and signal scale factors) and provides control commands to control the transceiver 200. With regard to the bit pump 230, for instance, the controller 240 provides control commands to, without limitation, enable coefficient updates, select update gains, enable convolution and delay line updates, and probe node selection. Once the transceiver 200 reaches data transparency (i.e., showtime), however, the bit pump 230 can process data without continuing intervention from the controller 240, assuming no exception event occurs. Regarding the system interface block 210, the controller 240 accesses system command and status registers used for configuration and control reset, diagnostics, activation, embedded operations channel processing and other functions. The controller 240 is also intricately involved in synchronizing the operation of the components and systems during all phases of operation of the transceiver 200.

It should be understood that the representative transceiver 200 is submitted for illustrative purposes only and other transceiver configurations compatible with the principles of the present invention may be employed as the application dictates.

Figure 3:
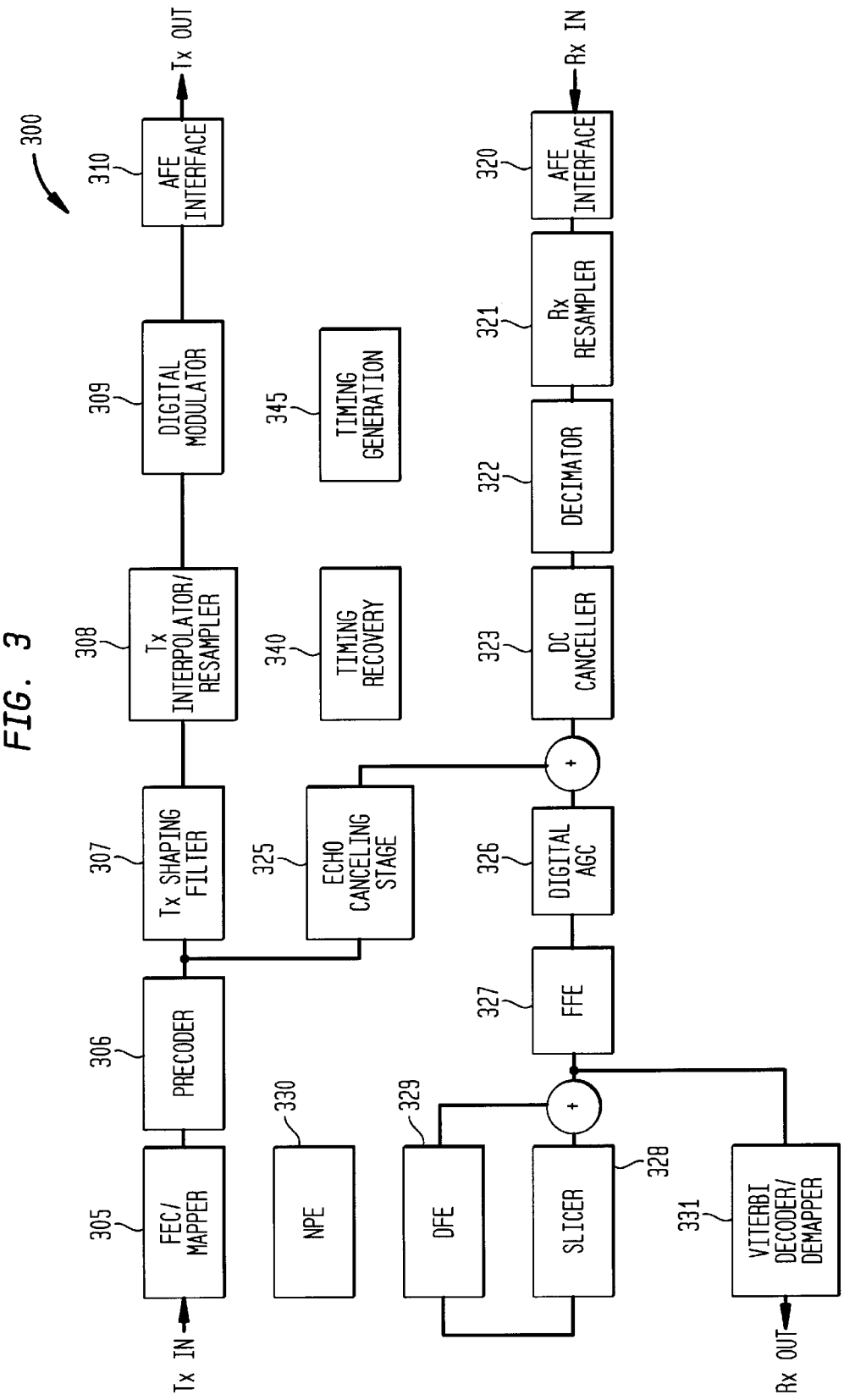
FIG. 3 illustrates a block diagram of an embodiment of a bit pump constructed according to the principles of the present invention.

Turning now to FIG. 3, illustrated is a block diagram of an embodiment of a bit pump 300 constructed according to the principles of the present invention. Again, the bit pump 300 primarily performs the digital signal processing functions associated with a transceiver and includes a transmit path and a receive path. While various blocks of the bit pump 300 are illustrated and described with respect to a transmitter or receiver portion of the bit pump 300, it should be understood that the circuits and systems that constitute the respective blocks perform functions on signals that span the bit pump 300 whether propagating along the transmit or receive path. Additionally, the functions associated with each block of the bit pump 300 are not necessarily discrete in nature. As will become more apparent, the functions are often integrated and resources are drawn from one functional block in the context another block to achieve the intended purpose. Finally, it should be understood that the circuits and systems associated with the present invention may be embodied in software, dedicated or hardwired discrete or integrated circuitry, or combinations thereof.

The bit pump 300 includes a forward error correction/mapper 305 coupled to an input of the transmit path. A signal presented at the input of the transmit path may be subject to various types of noise, in particular impulse noise, which is characteristically of short duration, but has a strong magnitude and a wide spectrum footprint. To provide a more reliable link, it is desirable to use a forward error correction coding techniques (e.g., a Reed-Solomon code) which are known to support reliable impulse noise resistance. Furthermore, the impulse noise immunity may be multiplied by a factor without additional redundancy by using forward error correction coding in conjunction with interleaving, where the factor is referred to as the depth of interleaving. Thus, the forward error correction/mapper 305 provides the forward error correction to a transmit signal presented at the input of the transmit path of the bit pump 300.

The bit pump 300 also includes a precoder 306 coupled to the forward error correction/mapper 305 in the transmit path. The precoder (e.g., commonly referred to as a channel precoder in the HDSL2 standard defined by the ANSI committee T1E1.4) is generally a fixed, non-linear filter that effectively implements a decision feedback equalization function in the transmitter portion of the bit pump 300. More specifically, the precoder 306 pre-distorts the transmitted signal so that after a corresponding receive signal propagating along the receive path passes through a feed forward equalization stage, there is insignificant post-cursor intersymbol interference distortion (or interference between adjacent data symbols caused by path distortion).

The precoder 306 is programmed by a controller of a transceiver (analogous to the controller 240 described with respect to FIG. 2) with decision feedback equalization coefficients that are calculated within the receiver portion of the bit pump 300 during activation. A motivation for using the precoder (e.g., a Tomlinson-Harashima precoder) 306 in lieu of a decision feedback equalizer at showtime is that the decision feedback equalization function is incompatible with a Viterbi decoder. To simultaneously realize the coding gain provided by a Viterbi decoder and the intersymbol interference cancellation provided by a decision feedback equalizer without noise enhancement, either the decision feedback equalizer should be replaced with the precoder 306 at showtime or the Viterbi decoder and decision feedback equalizer should be replaced with a reduced-state sequence detector. The precoder 306 is typically more efficient than the reduced-state sequence detector and, as such, the bit pump 300 employs the precoder 306 in the transmitter portion thereof.

The precoder 306, therefore, also employs a decision feedback equalizer 329 and noise prediction equalizer 330 associated with the receiver portion of the bit pump 300. The decision feedback equalizer 329 and noise prediction equalizer 330 are trained during activation to perform equalization in conjunction with other tasks necessary to operate the bit pump 300 and then reconfigured (by a controller command) at showtime to perform the functions associated with the precoder 306. Thus, the complexity of the precoder 306 is reduced. An input signal to the precoder 306 includes symbols from the forward error correction/mapper 305 and an output of the precoder 306 is a substantially white, uniform distributed signal sampled at the symbol rate.

The bit pump 300 also includes a transmitter shaping filter 307 coupled to the precoder 306 in the transmit path. The transmitter shaping filter 307 is a typically a finite impulse response (non-adaptive) digital filter that receives data at a 1x rate, interpolates to a 4x rate, and shapes the power spectrum density of the resulting 4x rate signal. The finite impulse response filter is programmable (i.e., the filter coefficients are stored in random access memory/registers) and the default settings for the transmitter shaping filter 307 are generally unknown, meaning that the transmitter shaping filter 307 is programmed by the controller at powerup. In an exemplary embodiment of the present invention, the transmitter shaping filter 307 can accommodate DSL-based technology and is compatible with the requirements associated with HDSL2. For instance, the length of the filter (e.g., 128 taps) is designed to meet the requirements associated with HDSL2.

The programmability of the transmitter shaping filter 307 provides several advantages for the bit pump 300. First, it allows the bit pump 300 to be applied in multi-rate or repeater applications. It also allows the system signal-to-noise ratio slicer margins to be improved when reductions can be made in component tolerances in the line interface to the bit pump 300. That is, tighter tolerances allow the transmit spectra to be refined to be closer to the upper bound set forth in the HDSL2 standard.

The bit pump 300 also includes a transmitter interpolator/resampler 308 coupled to the transmitter shaping filter 307 in the transmit path. The transmitter interpolator/resampler 308 upsamples the output of the transmitter shaping filter 307 to a sampling rate compatible with a digital modulator 309 coupled thereto. The architecture of the transmitter interpolator/resampler 308 generally employs a multiplier-free architecture based on a cascaded-integrator-comb interpolator [see, for instance, "An Economical Class of Digital Filters for Decimation and Interpolation," by E. B. Hogenauer, Institute of Electronic and Electrical Engineers (IEEE) Transactions on Acoustics, Speech, and Signal Processing, Vol. ASSP-29, No. 2, April 1981, which is incorporated by reference] to upsample from $4*F_{baud}$ to $72*F_{baud}$ followed by a first order Lagrange (linear) interpolator to resample the $72*F_{baud}$ output. The interpolator, therefore, increases the sampling rate by a factor of 18 (i.e., 72/4).

When determining the order (length) of the cascade-integrator-comb interpolator, there are generally two considerations, namely, the image attenuation and the pass-band droop. The interpolator is designed to suppress the images of the baseband signal such that the signals are below the level of the shaped quantization noise floor of the digital modulator 309. A fourth order cascade-integrator-comb interpolator should be adequate to ensure that the images in the transmit path are below (~5 dB) the level of the quantization noise.

Once the interpolation filter is chosen, any passband droop caused by that filter can be compensated for in the transmit path and typically by the transmitter shaping filter 307. While the compensation function increases the peak to root-mean-square ratio of the transmitter shaping filter 307, it does not significantly alter the peak to root-mean-square ratio of a signal arriving at the digital modulator 309 since the extra peaking added to compensate for the droop is removed by the cascaded-integrator-comb interpolator prior to reaching the digital modulator 309.

In addition to the above considerations, the overall gain of the cascaded-integrator-comb interpolator should be compensated for in the transmit path. The cascaded-integrator-comb interpolator in conjunction with the coefficients associated with the transmitter shaping filter 307 should be adequate to compensate the overall gain.

The resampler section (e.g., a linear interpolating resampler) of the transmitter interpolator/resampler 308 resamples the output of the interpolator according to the sampling phase and input delay-line shifts specified by a timing generator 345 associated with the bit pump 300. Thus, the transmitter interpolator/resampler 308 provides sampling phase and frequency corrections to the transmit signal for delivery to the digital modulator 309.

The digital modulator (e.g., a second order modulator) 309, coupled to the transmitter interpolator/ resampler 308 in the transmit path, generally produces a 5-level output signal with the quantization noise shaped to minimize the noise in the passband. A transmitter analog-front-end interface 310 receives the 5-level quantized output signal from the digital modulator 309, converts the signal to an analog signal (via a digital-to-analog converter) and provides an interface at an output of the transmit path of the bit pump 300. Both the digital modulator 309 and the transmitter analog-front-end interface 310 typically operate on a common 144x clock, with a transfer rate of 72x (the sample rate) desired. To facilitate this, the transmitter analog-front-end interface 310 generates a 72x sample transfer clock signal and the 5-level. quantized output is coded into three bits. The output data from the bit-pump 300 changes at the rising edge of the sample transfer clock signal and the transmitter analog-front-end interface 310 should sample the digital modulator 309 output data at the falling edge of the sample transfer clock signal.

Turning now to the receiver portion of the bit pump 300, a receiver analog-front-end interface 320 is coupled to an input of the receive path of the bit pump 300. The receiver analog-front-end interface 320 receives an analog signal from an HDSL2 path and converts the signal to a digital signal via a analog-to-digital converter associated therewith. The analog-to-digital converter and the bit pump 300 typically operate on a common 144x clock and a transfer rate of 72x (the sample rate) is desirable. The output of the analog-to-digital converter advantageously includes three single-bit outputs, which are grouped into a three-bit bus. The data at the output of the receiver analog-front-end interface 320 transitions at the rising edge of the clock pulse and the bit-pump 300 samples the analog-to-digital converter input data at the falling edge of the clock pulse.

The bit pump 300 also includes a receiver resampler 321 coupled to the receiver analog-front-end interface 320 in the receive path. The receiver resampler (including, for instance, a third order LaGrange interpolation stage and a linear interpolating stage) 321 merges the three outputs of the analog-to-digital converter from the receiver analog-front-end interface 320 into a single output and resamples the signal to phase-lock the sampling phase associated with a remote terminal and central office of a communication network employing the bit pump 300. In the central office, the transmit and receive timing is generally locked to a local oscillator and therefore fractional resampling is unnecessary. In the remote terminal, the signals associated with the timing generator 345 and receiver resampler 321 necessitate sampling phase, input delay-line shifts and output sample production times to synchronize a derived symbol clock to the remote terminal's local oscillator associated with the timing generator 345.

The bit pump 300 also includes a decimator 322 coupled to the receiver resampler 321 in the receive path. The decimator 322 downsamples the output of the receive resampler 321 from the $72*F_{baud}$ to a $2*F_{baud}$ symbol rate. The decimator 322 generally includes the following cascaded filter elements, namely, a cascaded-integrator-comb decimator to downsample from $72*F_{baud}$ to $8*F_{baud}$, a fifth order power-symmetric decimation filter to decimate from $8*F_{baud}$ to $4*F_{baud}$, and a seventh order power-symmetric decimation filter to decimate from $4*F_{baud}$ to $2*F_{baud}$.

The first decimation filter element uses a multiplier-free architecture based on the cascaded-integrator-comb filter structure analogous to the structure employed in the transmitter interpolator/resampler 308. The following two factors may be used to determine the decimation ratio and cascaded-integrator-comb filter order, namely, the quantization noise aliasing and the passband attenuation. In general, the lower the output sample rate, the greater the attenuation at the edge of the passband for a fixed bandwidth passband. For instance, employing a cascaded-integrator-comb decimation ratio of 18 to produce a $4*F_{baud}$ output, the attenuation at the edge of the passband in the signal received by the remote terminal would be ~2.8 dB for a filter that would provide ~68 dB of quantization noise suppression. If instead a cascaded-integrator-comb decimation ratio of nine is selected, the attenuation at the edge of the passband is reduced to ~0.7 dB with ~95 dB quantization noise suppression. To keep the decimator 322 from hindering the analog-digital-converter performance, a decimation ratio of nine and a filter order of five is suggested.

The second decimation filter element uses a canonical-signed-digit multiplier architecture based on the power-symmetric elliptic impulse response filter structure. Although such filters are based on equiripple, elliptic filters, the resulting filter from coefficient quantization is generally not considered elliptic since passband and stopband are no longer equiripple. Nevertheless, the power-symmetric property is maintained after coefficient quantization. It is this property that ensures that for an acceptable stopband attenuation, passband ripple will be insignificant. The second decimation filter is a fifth order power-symmetric decimation filter.

The third decimation filter element also uses a power-symmetric infinite impulse response filter structure. The third decimation filter is a seventh order power-symmetric decimation filter. Thus, the decimator 322 allows sampling phase and frequency corrections to be made on the receive signal propagating along the receive path. For a better understanding of the design criteria associated with such filter elements, see "Multirate Systems and Filter Banks," by P. P. Vaidyanathan, Prentice Hall Signal Processing Series, Chap. 5, Section 5.3, pp. 211–213, July 1992, which is incorporated herein by reference.

The bit pump 300 also includes a DC canceller 323 coupled to the decimator 322 in the receive path. In presence of fixed-point elements, such as a digital-to-analog converter, there is a possibility of a parasitic DC component in a canceled echo signal. While this component does not affect the residual echo root-mean-square value, it presents a concern regarding a feed forward and decision feedback equalization combination due to the lack of a transmitted signal. This artifact may account for as much as 1 dB of slicer mean squared errors at steady state operation. The DC canceller 323 (including, for instance, a single tap least-mean-square filter adapting to the steady value of one) is designed to reduce this degradation.

The bit pump 300 also includes an echo canceling stage 325 interposed between the transmit and receive path. The echo canceling stage 325 substantially cancels linear echo over the full dynamic range of the bit pump 300. The echo canceling stage 315 may be partitioned into master and slave echo canceling stages (e.g., hybrid digital filters) to assist in further defining and ultimately reducing the echo. Inasmuch as an explanation of an embodiment of an echo canceling stage 325 follows with respect to FIG. 4, a detailed discussion will not herein be submitted.

The bit pump 300 also includes a digital automatic gain controller 326 coupled to the DC canceller 323 in the receive path. The digital automatic gain controller 326 allows the bit pump 300 to process the data precisions that follow the echo canceling stage 325. The digital automatic gain controller 326 also employs a least-mean-square algorithm to train a feed forward equalization function without normalization.

More specifically, the digital automatic gain controller 326 limits the probability of clipping (generally the signal peaks of the analog-to-digital and digital-to-analog converters) to a desired level by means of fixing the output signal variance. A secondary effect of this operation is to alleviate the need for error normalization in feed forward equalization least-mean-square algorithm and to reduce the dynamic range requirement for feed forward equalization coefficients.

The bit pump 300 also includes an equalizer coupled to the DC canceller 323 and the echo canceling stage 325 in the receive path. The equalizer includes a feed forward equalizer 327, decision feedback equalizer 329 and a noise prediction equalizer 330. The feed forward equalizer 327 cooperates with the decision feedback equalizer 329 to whiten noise and equalize a linear distortion associated with the receive path. For instance, with 384 taps, the feed forward equalizer 327 can come within 0.2 dB of the optimal (signal-to-noise ratio margin) performance on a higher level standard noise case. The noise prediction equalizer 330 removes any correlation which may be left in the error signal after the equalization function. The noise prediction equalizer 330 also accelerates convergence within the bit pump 300. Portions of the equalizer can be reconfigured at showtime to become part of the precoder 306.

The bit pump 300 also includes a slicer 328 and a Viterbi decoder/demapper 331 coupled to a summing node with the equalizer in the receive path. The slicer 328 is a symbol-by-symbol decoder configured to slice pulse amplitude modulated signals in the bit pump 300 including signals associated with the echo canceling stage 325. The Viterbi decoder/demapper 331 decodes a 512-state code recommended in the HDSL2 standard and demaps the receive signal for egress from an output of the receive path of the bit pump 300.

The bit pump 300 also includes a timing recoverer 340 and timing generator 345. The timing recoverer 340 allows very fine control of sampling timing with very little jitter. For example, the transmit jitter in the remote terminal is generally small enough that a jitter echo canceller is not necessary. The timing generator 345 is proximally located between the timing recoverer 340 and the transmitter resampler of the transmitter interpolator/resampler 308 and the receiver resampler 321. The timing recoverer 340 is generally a phase detector and frequency integrator. A burst phase correction and updated frequency estimate are generally computed every 400 symbols by timing recovery and sent to the timing generator 345 to be used to control the transmitter resampler and the receiver resampler 321.

In the timing generator 345 and transmitter and receiver resamplers 321, the nominal sampling rate is $72*F_{baud}$, thereby allowing the sampling phase to be maintained with reference to 72x samples as described above. Additionally, the various elements of the timing generator 345 may be controlled by a central state machine which dictates when transmit and receive samples are to be generated and when transmit and receive input delay lines are to be advanced.

It should be understood, that the representative bit pump 300 is submitted for illustrative purposes only and other bit pump configurations compatible with the principles of the present invention may be employed as the application dictates.

Figure 4:
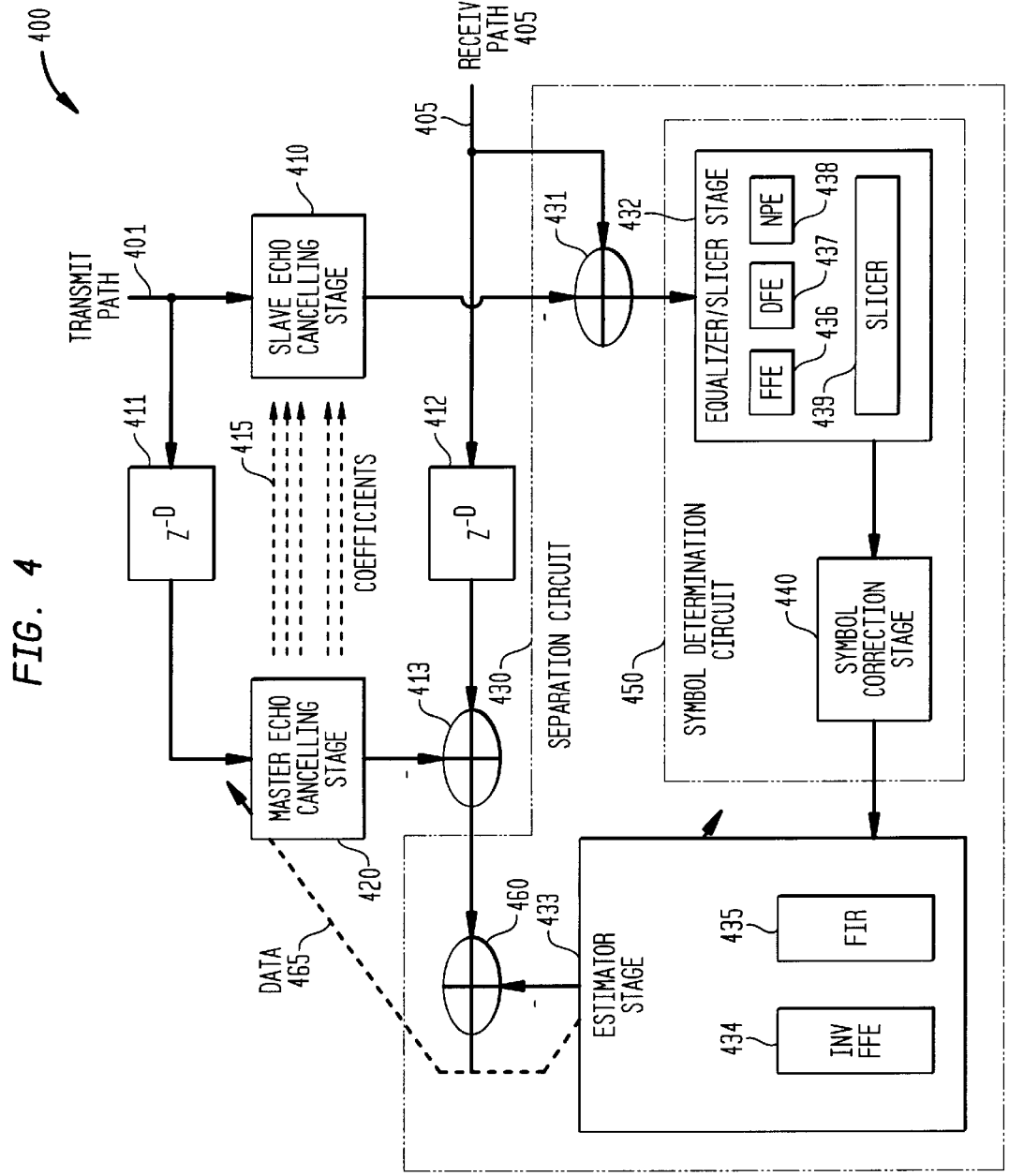
FIG. 4 illustrates a block diagram of an echo canceling system including an embodiment of a separation circuit constructed according to the principles of the present invention.

Turning now to FIG. 4, illustrated is a block diagram of an echo canceling system 400 including an embodiment of a separation circuit 430 constructed according to the principles of the present invention. The echo canceling system 400 includes a slave echo canceling stage 410 coupled to a transmit path 401 and a master echo canceling stage 420 that generates filter coefficients 415 and is coupled to a transmit path delay 411. The echo canceling system 400 also includes a receive path summing node 413 coupled to the master echo canceling stage 420 and to a receive path delay 412, which is further coupled to a receive path 405.

The echo canceling system 400 also includes the separation circuit 430. The separation circuit 430 includes a first separation summing node 431 coupled to the slave echo canceling stage 410 and the receive path 405. The separation circuit 430 also includes a symbol determination circuit 450 having an equalizer/slicer stage 432 coupled to the first separation summing node 431 and a symbol correction stage 440 coupled to the equalizer/slicer stage 432. The separation circuit 430 also includes an estimator stage 433 coupled to the symbol correction stage 440. The separation circuit 430 also includes a second separation summing node 460 coupled to the estimator stage 433 and to the receive path summing node 413. The master echo canceling stage 420 and the estimator stage 433 are adaptively coupled to receive data 465 from the second separation summing node 460.

The separation circuit 430 determines a residual level of an echo and then further reduces the echo. In the illustrated embodiment, the symbol determination circuit 450 accepts a receive signal, propagating along the receive path 405, that has been made substantially free of an echo and determines a symbol associated with the receive signal. The estimator stage 433, coupled to the symbol determination circuit 450, receives the symbol and provides an estimated receive signal. The separation circuit 430 generates the data 465 representing the residual level of the echo as a function of the estimated receive signal, an echo canceling signal generated by the master echo canceling stage 420 and a delayed receive signal (via the receive path delay 412).

The echo canceling system 400 is designed to cancel linear echo over the full dynamic range of a bit pump (such as the bit pump 300 illustrated in FIG. 3) employing the echo canceling system 400 to advantage. In particular, many deviations from an ideal performance of the echo canceling system 400 will have virtually no effect on its loop reach under a low-to-minimal noise situation. In the illustrated embodiment, the architecture of the echo canceling system 400 incorporates the use of two echo canceling stages, the slave echo canceling stage 410 and the master echo canceling stage 420. The slave echo canceling stage 410 and the master echo canceling stage 420 share the filter coefficients 415, which are created by the master echo canceling stage 420 and stored in a common memory location accessible to both, thereby generating respective echo canceling signals. The slave echo canceling stage 410 performs only the convolution of a transmit signal in the transmit path 401 received from a precoder (e.g., a Tomlinson-Harashima precoder) of the bit pump.

The signal from the precoder and the receive signal are appropriately delayed by the transmit and receive path delays 411, 412, respectively. The delay structure accommodates for a signal propagation delay that occurs in the symbol determination circuit 450 and the estimator stage 433. The equalizer/slicer stage 432, the symbol correction stage 440 and the estimator stage 433 cooperate to separate a portion of the receive signal from a residual level of the echo that are received from the receive path summing node 413. This action allows the residual echo level to become a significant portion of the data 465 from the second separator summing node 460. The data 465 is then used by the master echo canceling stage 420 to adaptively generate the shared filter coefficients 415. Advantageously, the data 465 (representing principally the residual level of the echo) may be further reduced since it is no longer masked by the receive signal. Therefore, the filter coefficients 415 may be generated that reduce the residual level to a smaller value closer to the ideal value of zero.

Another advantage associated with this architecture is an enhanced capability to accommodate both updates and disturber or other perturbations during showtime operation. A significant perturbation may be caused by a changing or slewing of the ambient temperature during steady-state or showtime operation. The perturbation typically causes a significant degradation in system performance of a conventional echo canceller. In particular, it can account for as much as 4.7 dB of allocated signal-to-noise margin.

In a half duplex operating mode, updating the system parameters does not represent a problem because the system adapts (at the system operating point) with a very high signal-to-noise ratio. However, in a full duplex operating mode, tracking rapid ambient changes may present a substantial problem due to the presence of interfering signals such as the echo for the equalizer/slicer stage 432 and the receive signal for updates to the echo canceling system 400. If the receive signal is considerably greater than the echo, the adaptation rates during the full duplex update period may be very slow if a portion of the receive signal is not removed from the data 465. Effectively magnifying the residual level of the echo in the data 465 by removal of a portion of the receive signal provides an enhanced update capability for the echo canceling system 400.

The equalizer portion of the equalizer/slicer 432 includes the a feed forward equalizer 436, a decision feedback equalizer 437 and a noise prediction equalizer 438, which operate as least-mean-square adaptive filters. As previously mentioned, the feed forward equalizer 436 and the decision feedback equalizer 437 cooperate to whiten noise and equalize the linear distortion caused by the channel. The noise prediction equalizer 438 functions to remove any correlation which may be left after equalization. The noise prediction equalizer 438 accelerates training of the echo canceling system 400 during activation. Therefore, use of the noise prediction equalizer 438 in the illustrated embodiment provides a key advantage to the performance of the echo canceling system 400 and to the bit pump as well.

The feed forward equalizer 436, which generally operates at twice the baud rate, is adapted by the least-mean-square algorithm and provides an output that is decimated to the baud rate before further processing. The decision feedback equalizer 437 operates at the baud rate and is adapted by the least-mean-square algorithm. The noise prediction equalizer 438 operates at the baud rate and is also adapted by the least-mean-square algorithm. With the proper timing, the combination of the feed forward equalizer 436 and the decision feedback equalizer 437 can whiten the noise at the input of a slicer 439 thereby offering better performance. The noise prediction equalizer 438, however, whitens the noise at the input of the slicer 439 much more quickly.

The decision feedback equalizer 437 and noise prediction equalizer 438 coefficients are initialized to zero. The feed forward equalizer 436 will initialize with a single non-zero tap. The position of this non-zero tap determines the cursor position within the feed forward equalizer 436. In the illustrated embodiment, the cursor position is at a tap 70 taking into account length verses performance for the feed forward equalizer 436. This position allows the cursor to drift due to temperature changes in the channel, while maintaining acceptable performance.

In the illustrated embodiment, the slicer 439 (a symbol-by-symbol decoder that determines a symbol associated with the receive signal) slices a 16 pulse-amplitude modulated signal (with modulo) in the echo canceling system 400. The slicer 439 is a 16 level slicer which is used to obtain an error signal for the feed forward equalizer 436 during showtime update. Other slicers (e.g., programmable slicers) in the bit pump slice a 2 pulse-amplitude modulated signal (without modulo) and have the capability to slice 4 pulse-amplitude modulated signals and 8 pulse-amplitude modulated signals with modulo, as necessary.

The symbol correction stage 440 provides for a robust operation of the echo canceling system 400 through the generation of proper symbols in the separation circuit 430 even when higher disturber signal or lower signal-to-noise ratio conditions occur. The symbol correction stage 440, in an exemplary embodiment, employs a Viterbi decoder and weighting logic to provide about a six decibels signal-to-noise ratio advantage over the use of the equalizer/slicer stage 432 alone. This advantage is particularly enhancing at low signal-to-noise ratios, especially those approaching 20–22 dB.

With regard to the estimator stage 433, since the receive signal constitutes a significant impairment to the echo cancellation operation, the receive signal itself should be canceled. The function of the estimator stage 433, therefore, is to approximate the delayed version of the receive signal thereby developing an estimated receive signal. The dynamics of this operation are analogous to linear, fractionally-spaced finite impulse response-minimum mean square equalization, which corresponds to a finite length Wiener solution of the least squares inverse problem.

The estimator stage 433 employs an inverse feed forward equalizer 434 as a channel estimator. The estimator stage 433 includes a finite impulse response filter 435 which uses symbols recovered by the slicer 439. The symbols are resampled to twice the symbol rate to estimate the portion of the receive signal present in the composite signal presented by the receive path summing node 413. The inverse feed forward equalizer 434 is adapted by using the least-mean-square rule, while attempting to drive the data 465 to zero employed by the master echo canceling stage 420.

A few key performance assumptions for the estimator stage 433 may be summarized as follows. First, the noise signal at the slicer 439 is substantially zero mean and white. This is reasonable since a purpose associated with the feed forward equalizer 436 is to whiten the noise spectrum. Second, the noise signal at the slicer 439 is uncorrelated with the receive symbols. Finally, the receive symbols are substantially white and uncorrelated, due to a standard compliant transmission.

The convergence properties of the estimator stage 433 are limited by the signal-to-noise ratio performance of the slicer 439. Asymptotically in both time and inverse feed forward equalizer length, cancellation of the receive signal is approximately equivalent to the signal-to-noise ratio at the slicer 439. With limited training time and length, the estimator stage 433 provides approximately 21 dB of received signal reduction on a central office side and approximately 26 dB of receive signal reduction on a remote terminal side of a communication network employing a transceiver (and bit pump) with the echo canceling system 400. Performance of the estimator stage 433 becomes more important for cases of low signal-to-noise ration margin. To ensure minimum performance degradation upon commencement of updates to the echo canceling system 400, system training should last until an asymptotic steady state performance is achieved, which is approximately 4 seconds for the illustrated embodiment.

Figure 5:
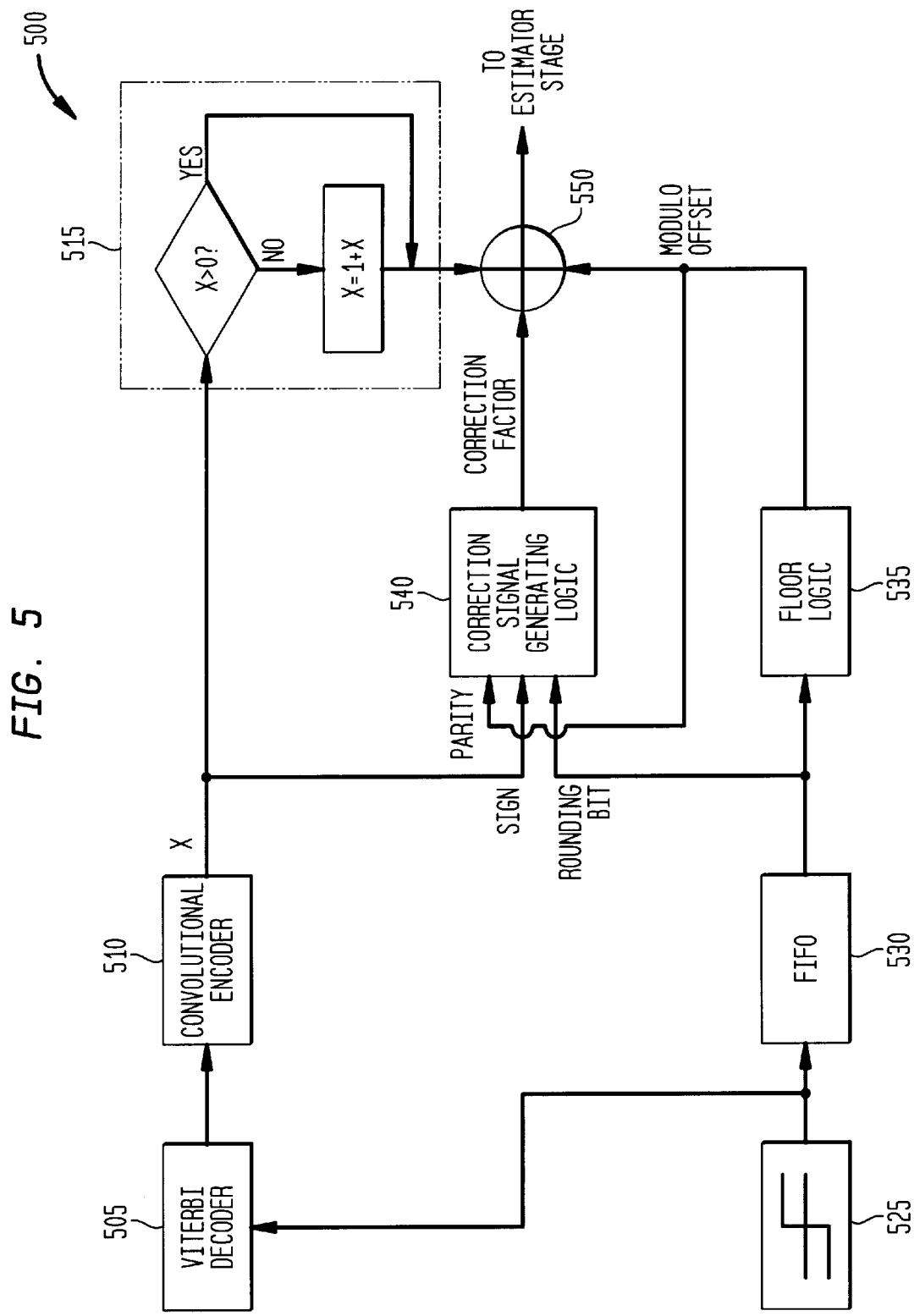
FIG. 5 illustrates a block diagram an embodiment of a symbol correction stage constructed according to the principles of the present invention.

Turning now to FIG. 5, illustrated is a block diagram of an embodiment of a symbol correction stage 500 constructed according to the principles of the present invention. The symbol correction stage 500 includes a Viterbi decoder 505, a convolution encoder 510 coupled to the Viterbi decoder 505, and a query logic 515, coupled to the convolution encoder 510. The symbol correction stage 500 is also coupled to a slicer 525 and includes a first-in-first-out memory unit 530 and a floor logic 535. The Viterbi decoder 505 and the first-in-first-out memory unit 530 are coupled to the slicer 525 and the floor logic 535 is coupled to the first-in-first-out memory unit 530.

The symbol correction stage 500 also includes a correction signal generating logic 540 and a summing node 550. The correction signal generating logic 540 is coupled to the convolution encoder 510, the first-in-first-out memory unit 530 and the floor logic 535. The summing node 550 is coupled to the query logic 515, the correction signal generating logic 540 and the floor logic 535 to provide an output to, for instance, an estimator stage (such as the estimator stage 433 illustrated in FIG. 4).

With reference to FIG. 4, the role of the estimator stage 433 is primarily to remove the receive signal at the receive path summing node 413. To perform this task, the estimator stage 433 generally receives symbols (i.e., pre-modulo operation information) as an input and approximates a zero-forcing inverse of the feed forward equalizer 436 channel as coefficients. The received symbols are available as an output of the combination of the slicer 525 and the first-in-first-out memory unit 530, which just transports the symbols. An extended slicer may be used to perform a symbol detection while allowing the input to be "non-moduloed".

In lower signal-to-noise ratio conditions, however, the slicing operation may produce erroneous results for as many as ten percent of the symbols. These errors propagate through the estimator stage 433 into the receive path summing node 413 where they may produce a variance in the coefficients of the slave and master echo canceling stages 410, 420. This action tends to further reduce the signal-to-noise ratio which may thereby push the bit pump into a vicious cycle of continuously degrading performance.

Returning now to the symbol correction stage 500 of FIG. 5, the symbol correction stage 500 provides a remedy for such a problem. The inclusion of the Viterbi decoder 505 in the generation of the receive symbols for the estimator stage enhances the accuracy of symbol determination and therefore improves overall quality of the bit pump. The symbol correction stage 500 employs three information streams to refine the symbol at the output thereof. A first information stream involves a combination of the Viterbi decoder 505, the convolution encoder 510 and the query logic 515. This first information stream contributes recovered, high accuracy transmitted bits with up to about a 5 dB signal-to-noise ratio improvement over the extended slicer combination.

A second information stream involves the floor logic 535 and the extended slicer combination, which contribute signal modulo information. The third information stream involves the correction signal generating logic 540, which corrects for errors in the modulo information caused by erroneous slicing. The combination of information results in a high accuracy recovery of symbols and their respective modulo and therefore better performance for the estimator stage. A sequence of operation for the symbol correction stage 500 is described below for the illustrated embodiment.

The Viterbi decoder 505 typically uses a 64 bit trace-back length to accomplish its improvements, which is then passed through an instance of the convolutional encoder 510. The output of the convolutional encoder 510 is monitored by the query logic 515. If the output is less than zero, the query logic 515 adds a one thereto before presenting the information to the summing node 550. If the output-is greater than zero, the information is presented to the summing node 550 unchanged. This output includes the transmitted bits that are passed on to the estimator stage. Modulo information is extracted from the sliced symbols. The output of the slicer 525 is delayed in the first-in-first-out memory unit 530 by the depth of the 64 bit trace-back length of the Viterbi decoder 505 in order to align it with the output of the Viterbi decoder 505.

Three key pieces of information are then extracted from the information streams. A first integer lower than the sliced value representing the floor operation on the sliced value, the parity (representing divisibility by two) of that integer and a first bit of the part discarded during the floor operation. A combination of the sign of the output of the convolutional encoder 510, the parity and the first bit of the discarded part are used to perform the corrections due to the improper slicing at modulo and floor boundaries. An example of the correction rules and correction conditions are illustrated with respect to Table 1 below and FIG. 6.

Turning now to FIG. 6, illustrated are modulo diagrams demonstrating a representative collection of correction conditions that lead to a determination of non-trivial correction factors for the symbol correction stage 500 of FIG. 5. The collection of correction conditions includes first, second, third and fourth correction conditions 600, 605, 610, 615, which will hereinafter be described with continuing reference to FIG. 5. Each of the correction conditions 600, 605, 610, 615 is plotted on a diagram that is keyed to a modulo value m. These modulo diagrams indicate a zero crossing boundary 2m, an upper modulo boundary 2m+1 and a lower modulo boundary 2m−1. Each of the correction conditions 600, 605, 610, 615 also indicates a specific case of the input parameters A (representing parity of the modulo), B (representing the sign of the convolutional encoder output) and C (representing the first discarded bit at floor operation) to the correction signal generating logic 540 of FIG. 5 that is further defined in Table 1 below.

TABLE 1

Correction Factors for the symbol correction stage

| CASE | (A) PARITY OF MODULO | (B) SIGN OF CONVOLUTIONAL ENCODER OUTPUT | (C) FIRST DISCARDED BIT AT FLOOR OPERATION | CORRECTION FACTOR |
|---|---|---|---|---|
| 1 | 0 | −1 | 0 | −1 |
| 2 | 0 | −1 | 1 | 1 |
| 3 | 0 | 1 | 0 | 0 |
| 4 | 0 | 1 | 1 | 0 |
| 5 | 1 | −1 | 0 | 0 |
| 6 | 1 | −1 | 1 | 0 |
| 7 | 1 | 1 | 0 | −1 |
| 8 | 1 | 1 | 1 | 1 |

Table 1 shows eight different cases representing eight possible input combinations to the correction signal generating logic 540. As shown in Table 1, the three inputs (A=0, B=−1, C=0) the correction signal generating logic 540 for case 1 produce a non-trivial correction factor of −1. FIG. 6 shows that this represents the first correction condition 600 where the slicer 525 detects above the modulo zero crossing boundary 2m and the Viterbi decoder 505 detects below the modulo zero crossing boundary 2m.

Similarly, the second correction condition, 605, corresponding to case 8 of Table 1, represents a complementary condition to the first correction condition 600 (i.e., case 1) yielding a complementary, non-trivial correction factor of 1. In the same manner, the third correction condition 610 representing case 2 and its complementary fourth correction condition 615 representing case 7 produce correction factors of 1 and −1, respectively. Table 1 shows that cases 3, 4, 5 and 6 produce trivial correction factors of 0 (zero) representing no correction.

In cases 2 and 7, a modulo boundary has been crossed, and a correction in modulo value is necessary. In order to calculate the correction information on parity of the number of modulos in the sliced symbol (i.e., parity of floor of the sliced symbol) the sign of the output of the convolutional encoder 510 is employed. However, if only that information is used, case 7 is indistinguishable from case 4, in which correction in number of modulos is not necessary. To mitigate this problem, additional information on position of the sliced symbol within the modulo boundary is employed. That information is gained through the first bit of the data discarded during the floor operation. This bit gives the position of the sliced symbol within the modulo boundaries wherein small errors across the boundaries are securely detected.

It should be understood, that the embodiments of the echo canceling system including the separation circuit and symbol correction stage illustrated and described with respect to the preceding FIGUREs are submitted for illustrative purposes only and other configurations compatible with the principles of the present invention may be employed as the application dictates.

In summary, the present invention introduces, in one aspect, a separation circuit that distinguishes a residual level of the echo from the receive signal to more completely attenuate the echo. The ability to distinguish the residual level depends on the ability of the separation circuit to estimate the receive signal and separate it from a combined residual echo level and receive signal. The present invention employs an enhanced capability to establish the receive signal over a wide signal-to-noise ratio. As a result, the echo canceling system reduces the echo to levels not previously attainable, thereby increasing the fidelity of communication traffic (e.g., voice, video or data) traversing a network employing the bit pump.

For a better understanding of digital communications, in general, and digital subscriber line services including the standards and systems that support the technology, see "Understanding Digital Subscriber Line Technology" by Thomas Starr, Peter Silverman, and John M. Coiffi, Prentice Hall (1998), and "Digital Communication" by Edward A. Lee and David G. Messerschmitt, Kluwer Academic Publishers (1994), which are incorporated herein by reference.

Although the present invention has been described in detail, those skilled in the art should understand that they can make various changes, substitutions and alterations herein without departing from the spirit and scope of the invention in its broadest form.

What is claimed is:

1. For use with an echo canceling system couplable between a transmit and receive path of a bit pump and adapted to generate an echo canceling signal, a separation circuit, comprising:

a symbol determination circuit configured to accept a receive signal, propagating along said receive path, substantially free of an echo and determine a symbol associated with said receive signal; and an estimator stage, coupled to said symbol determination circuit, configured to receive said symbol and provide an estimated receive signal, said separation circuit configured to generate data representing a residual level of said echo as a function of said estimated receive signal and said echo canceling signal.

2. The separation circuit as recited in claim 1 wherein said symbol determination circuit comprises an equalizer/slicer stage configured to determine said symbol and a symbol correction stage configured to refine said symbol.

3. The separation circuit as recited in claim 2 wherein said symbol correction stage comprises a Viterbi decoder configured to receive said symbol and enhance a signal-to-noise ratio of said symbol.

4. The separation circuit as recited in claim 2 wherein said symbol correction stage comprises a convolutional encoder configured to reduce intersymbol interference associated with said symbol.

5. The separation circuit as recited in claim 2 wherein said symbol correction stage comprises logic circuits configured to provide a correction signal and modulo offset signal to refine said symbol.

6. The separation circuit as recited in claim 1 wherein said estimator stage comprises an inverse feed forward equalizer and a finite impulse response filter.

7. The separation circuit as recited in claim 1 wherein said echo canceling system comprises master and slave echo canceling stages.

8. For use with an echo canceling system couplable between a transmit and receive path of a bit pump and generating an echo canceling signal, a method of determining a residual level of an echo associated with a receive signal propagating along said receive path, comprising:

accepting a receive signal substantially free of said echo;

determining a symbol associated with said receive signal;

providing an estimated receive signal as a function of said symbol; and generating data representing said residual level as a function of said estimated receive signal and said echo canceling signal.

9. The method as recited in claim 8 wherein said determining said symbol comprises refining said symbol.

10. The method as recited in claim 9 wherein said refining said symbol comprises enhancing a signal-to-noise ratio of said symbol.

11. The method as recited in claim 9 wherein said refining said symbol comprises reducing intersymbol interference associated with said symbol.

12. The method as recited in claim 9 wherein said refining said symbol comprises employing a correction signal and modulo offset signal.

13. The method as recited in claim 8 wherein said providing is performed by an estimator stage comprising an inverse feed forward equalizer and a finite impulse response filter.

14. The method as recited in claim 8 wherein said echo canceling system comprises master and slave echo canceling stages.

15. An echo canceling system coupled between a transmit and receive path of a bit pump, comprising:

an echo canceling stage that generates an echo canceling signal; and a separation circuit coupled to said echo canceling stage and including:

a symbol determination circuit that accepts a receive signal, propagating along said receive path, substantially free of an echo and determines a symbol associated with said receive signal, and an estimator stage, coupled to said symbol determination circuit, that receives said symbol and provides an estimated receive signal, said separation circuit generating data representing a residual level of said echo as a function of said estimated receive signal and said echo canceling signal.

16. The echo canceling system as recited in claim 15 wherein said symbol determination circuit comprises an equalizer/slicer stage that determines said symbol and a symbol correction stage that refines said symbol.

17. The echo canceling system as recited in claim 16 wherein said symbol correction stage comprises a Viterbi decoder that receives said symbol and enhances a signal-to-noise ratio of said symbol.

18. The echo canceling system as recited in claim 16 wherein said symbol correction stage comprises a convolutional encoder that reduces intersymbol interference associated with said symbol.

19. The echo canceling system as recited in claim 16 wherein said symbol correction stage comprises logic circuits that provide a correction signal and modulo offset signal to refine said symbol.

20. The echo canceling system as recited in claim 15 wherein said estimator stage comprises an inverse feed forward equalizer and a finite impulse response filter.

21. The echo canceling system as recited in claim 15 wherein said echo canceling stage comprises master and slave echo canceling stages.

22. A bit pump having a transmit and receive path, comprising:

a precoder, coupled to said transmit path, that preconditions a transmit signal propagating along said transmit path;

a modulator, coupled to said precoder, that reduces a noise associated with said transmit signal;

an analog-to-digital converter, coupled to said receive path, that converts a receive signal received at said bit pump into a digital format;

a decimator, coupled to said analog-to-digital converter, that downsamples said receive signal propagating along said receive path; and an echo canceling system, coupled between said transmit and receive path, that attenuates an echo in said receive signal, including:

an echo canceling stage that generates an echo canceling signal; and a separation circuit coupled to said echo canceling stage and including:

a symbol determination circuit that accepts said receive signal substantially free of said echo and determines a symbol associated with said receive signal, and an estimator stage, coupled to said symbol determination circuit, that receives said symbol and provides an estimated receive signal, said separation circuit generating data representing a residual level of said echo as a function of said estimated receive signal and said echo canceling signal.

23. The bit pump as recited in claim 22 wherein said symbol determination circuit comprises an equalizer/slicer stage that determines said symbol and a symbol correction stage that refines said symbol.

24. The bit pump as recited in claim 23 wherein said symbol correction stage comprises a Viterbi decoder that receives said symbol and enhances a signal-to-noise ratio of said symbol.

25. The bit pump as recited in claim 23 wherein said symbol correction stage comprises a convolutional encoder that reduces intersymbol interference associated with said symbol.

26. The bit pump as recited in claim 23 wherein said symbol correction stage comprises logic circuits that provide a correction signal and modulo offset signal to refine said symbol.

27. The bit pump as recited in claim 22 wherein said estimator stage comprises an inverse feed forward equalizer and a finite impulse response filter.

28. The bit pump as recited in claim 22 wherein said echo canceling stage comprises master and slave echo canceling stages.

29. A transceiver, comprising:

a framer that formats signals within said transceiver;

a bit pump coupled to said framer and having a transmit and receive path, including:

a precoder, coupled to said transmit path, that preconditions a transmit signal propagating along said transmit path;

a modulator, coupled to said precoder, that reduces a noise associated with said transmit signal;

an analog-to-digital converter, coupled to said receive path, that converts a receive signal received at said bit pump into a digital format;

a decimator, coupled to said analog-to-digital converter, that downsamples said receive signal propagating along said receive path; and an echo canceling system, coupled between said transmit and receive path, that attenuates an echo in said receive signal, including:

an echo canceling stage that generates an echo canceling signal; and a separation circuit coupled to said echo canceling stage and including:

a symbol determination circuit that accepts said receive signal substantially free of said echo and determines a symbol associated with said receive signal, and an estimator stage, coupled to said symbol determination circuit, that receives said symbol and provides an estimated receive signal, said separation circuit generating data representing a residual level of said echo as a function of said estimated receive signal and said echo canceling signal; and a controller that controls an operation of said framer and said bit pump.

30. The transceiver as recited in claim 29 wherein said symbol determination circuit comprises an equalizer/slicer stage that determines said symbol and a symbol correction stage that refines said symbol.

31. The transceiver as recited in claim 30 wherein said symbol correction stage comprises a Viterbi decoder that receives said symbol and enhances a signal-to-noise ratio of said symbol.

32. The transceiver as recited in claim 30 wherein said symbol correction stage comprises a convolutional encoder that reduces intersymbol interference associated with said symbol.

33. The transceiver as recited in claim 30 wherein said symbol correction stage comprises logic circuits that provide a correction signal and modulo offset signal to refine said symbol.

34. The transceiver as recited in claim 29 wherein said estimator stage comprises an inverse feed forward equalizer and a finite impulse response filter.

35. The transceiver as recited in claim 29 wherein said echo canceling stage comprises master and slave echo canceling stages.

* * * * *